(12) United States Patent
Mounier et al.

(10) Patent No.: US 8,618,780 B2
(45) Date of Patent: Dec. 31, 2013

(54) MULTIMODE VOLTAGE REGULATOR AND METHOD FOR PROVIDING A MULTIMODE VOLTAGE REGULATOR OUTPUT VOLTAGE AND AN OUTPUT CURRENT TO A LOAD

(75) Inventors: Philippe Mounier, Tournefeuille (FR); Estelle Huynh, Toulouse (FR); David Lopez, Toulouse (FR); Thierry Sicard, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 206 days.

(21) Appl. No.: 13/125,856

(22) PCT Filed: Nov. 24, 2008

(86) PCT No.: PCT/IB2008/055650
§ 371 (c)(1),
(2), (4) Date: Apr. 25, 2011

(87) PCT Pub. No.: WO2010/058252
PCT Pub. Date: May 27, 2010

(65) Prior Publication Data
US 2011/0210709 A1    Sep. 1, 2011

(51) Int. Cl.
*G05F 1/573* (2006.01)
*G05F 1/00* (2006.01)
*G06F 1/00* (2006.01)

(52) U.S. Cl.
USPC ............ 323/277; 323/281; 323/279; 713/323

(58) Field of Classification Search
USPC ........... 323/273–271, 273–281; 713/320–323
See application file for complete search history.

(56) References Cited

U.S. PATENT DOCUMENTS

| | | | |
|---|---|---|---|
| 6,664,773 B1 | 12/2003 | Cunnac et al. | |
| 6,677,735 B2 | 1/2004 | Xi | |
| 6,806,690 B2 | 10/2004 | Xi | |
| 6,897,715 B2 | 5/2005 | Barber, Jr. et al. | |
| 6,978,934 B2 * | 12/2005 | Feng | 235/454 |
| 7,148,670 B2 * | 12/2006 | Inn et al. | 323/283 |
| 2005/0052081 A1 | 3/2005 | Sayama | |
| 2005/0212497 A1 | 9/2005 | Cha | |
| 2007/0018711 A1 | 1/2007 | Miki et al. | |

(Continued)

OTHER PUBLICATIONS

Osman Abdel-Rahman; Analysis and Design of Voltage Regulator with Adaptive FET Modulation Scheme and improved Efficiency; Mar. 2008; vol. 23, No. 2; 896-906.*

(Continued)

*Primary Examiner* — Bao Q Vu
*Assistant Examiner* — Zekre Tsehaye (57) ABSTRACT

A multimode voltage regulator comprises an output for providing a regulator output voltage Vdd and an output current to a load and a low power reference voltage source having a reference voltage output providing the regulator output voltage Vdd, when in a first low power mode the output current is not greater than a threshold value. It may comprise a buffer amplifier having an output providing the regulator output voltage Vdd, when the output current is greater than the threshold value and a first bias voltage input being connected in a second low power mode to the reference voltage output when the output current is greater than the threshold value for less than a predefined time. And it may comprise a mode controller for automatically determining the output current and automatically switching from first low power mode to second low power mode.

20 Claims, 8 Drawing Sheets

(56) References Cited

U.S. PATENT DOCUMENTS

2007/0290657 A1 12/2007 Cretella et al.
2008/0307240 A1* 12/2008 Dahan et al. .................. 713/320
2009/0102294 A1* 4/2009 Hodges et al. ................ 307/126

OTHER PUBLICATIONS

Freescale Semiconductor: "System Basis Chip With Enhanced High Speed CAN Transceiver" Advance Information, Document No. MC33742, Rev. 11, Jun. 2008, pp. 1-70.

Infineon: "Integrated HS-CAN, LIN, LDA and HS Switch" System Basis Chip, Automotive Power, Data Sheet, TLE 7263E, Rev. 1.5.1, Jun. 2007, pp. 1-63.

International Search Report and Written Opinion correlating to PCT/IB2008/055650 dated Oct. 29, 2009.

"High-Speed CAN/LIN Fail-Safe System Basis Chip"; NXP Semiconductors Product Data Sheet UJA1065; 76 Pages; Feb. 25, 2010; NXP B.V.

* cited by examiner

MULTIMODE VOLTAGE REGULATOR AND METHOD FOR PROVIDING A MULTIMODE VOLTAGE REGULATOR OUTPUT VOLTAGE AND AN OUTPUT CURRENT TO A LOAD

FIELD OF THE INVENTION

This invention in general relates to electronic control units and more specifically to voltage regulators for integrated power supply circuits.

BACKGROUND OF THE INVENTION

In automotive electronics, an electronic control unit (ECU) or control module is an embedded system that controls one or more of the electrical systems or subsystems in a vehicle. A typical ECU comprises a microcontroller unit (MCU) and an integrated power supply circuit comprising a voltage regulator. The power supply IC provides voltage $V_{dd}$ and current to the MCU. The power supply IC may be part of a system base chip (SBC) also comprising other circuitry, such as other power supplies, local interconnect network (LIN) interfaces, controller area network (CAN) interfaces, voltage- and current-protection circuits, a watchdog for monitoring MCU operation, wake-up logic circuits, high side and/or low side switches, a logic state machine and so on. An ECU may have different modes of operation, such as a "normal", "run" or "active" mode and a low power (LP) mode in order to reduce overall power consumption. Furthermore, an ultra-low power (ULP) mode may be available, where no output voltage and current is provided, only internal voltages are supplied and current consumption of the regulator is reduced to a minimum.

In "normal" mode, an MCU may be supplied with power and may be able to provide complete functionality. Its supply current may for example be in the range of ten to several hundreds of milliampere, with an internal current consumption of the power supply IC of a few milliampere (mA). In "normal" mode, a state-of-the-art power supply IC may be able to deliver some hundreds of milliampere, and at the same time provide a highly accurate voltage $V_{dd}$. In this mode, several protection schemes may be available, such as circuits for detecting and handling overcurrent, undervoltage, and overtemperature.

In a low power mode, the MCU may remain powered, however its current consumption may be reduced to some microampere (μA). In this mode, a connected power supply IC may also reduce its consumption to a value in a range of some microampere. In order to minimize current consumption, its protection schemes may also be disabled or reduced. In an automotive environment, the total system current consumption in low power mode may be a critical system parameter, as LP mode may be applied to the system, when the vehicle engine is turned off and therefore not recharges a battery of the vehicle supplying the current. The current consumed during LP mode of a state-of-the-art car ECU may, for example, be about 100 μA for a medium complexity ECU and about 500 μA for a very high complexity ECU. This standby current cannot be reduced to 0 A, since the power supply has to supply the MCU in the event of a wake-up.

The transition from LP mode to "normal" mode may be caused by a wake up event. The wake up event may be generated by different sources, for example by the power supply IC itself or by the MCU.

In an automotive environment, ECUs for car body applications may perform cyclic wake-up operations, that is an ECU may cyclically switch from LP mode to normal mode and check, whether or not an active state of the MCU is required and switch back to LP mode, when no wake-up is required. For example, an ECU controlling access to a car may determine each period of time T, whether or not the car is being opened using a key or a remote control. Therefore, the ECU may need to be awake for a time "t" during period T. Cyclic wake-up increases overall current consumption due to high consumption during time period "t", therefore average consumption may be roughly proportional to "t"/T. During cyclic wake-up operation, state-of-the art circuits may switch from an LP mode to normal mode. Although the active time "t" may be short compared to cycle period T, operation in normal mode increases average current consumption. Furthermore, switching back from normal mode to LP mode may not be possible instantaneously, but may require additional transition time.

Since information, whether or not the system should stay in normal mode or return back to LP mode is available to the MCU, it may generally notify the power supply IC when to switch to another mode of operation. However, other methods relying on the evaluation of the load current may allow automatic transition from LP mode to normal mode as well.

Since transition from LP mode to normal mode may start after receiving a wake-up event notification from the MCU, a power supply IC may first enable protection schemes and enable its circuitry in order to deliver the full current to the MCU with the best output voltage accuracy. The MCU may for example use a serial peripheral interface (SPI) bus for sending SPI commands to the power supply IC.

SUMMARY OF THE INVENTION

The present invention provides a multimode voltage regulator and a method for providing a multimode voltage regulator output voltage and an output current to a load as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Because the apparatus implementing the present invention is, for the most part, composed of electronic components and circuits known to those skilled in the art, circuit details will not be explained in any greater extent than that considered necessary as illustrated below, for the understanding and appreciation of the underlying concepts of the present invention and in order not to obfuscate or distract from the teachings of the present invention.

Figure 1:
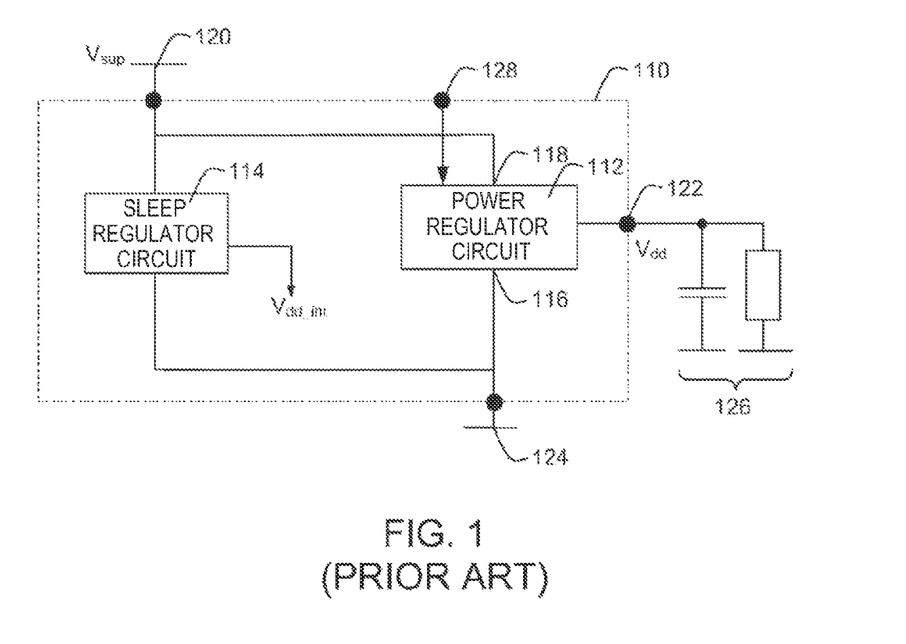
FIG. 1 schematically shows a block diagram of an example of a prior art voltage regulator.

Referring to FIG. 1, a schematic block diagram of an example of a prior art multimode voltage regulator 110 is shown, comprising two regulator circuits 112, 114; a power regulator circuit 112 for providing the multimode voltage regulator's output voltage $V_{dd}$ and output current and a "sleep" regulator 114 for providing an internal voltage $V_{dd\_int}$ to internal circuits of the multimode voltage regulator 110. The power regulator circuit 112 may be a low dropout (LDO) regulator. An LDO regulator is a DC linear voltage regulator which can operate with a very small input-output differential voltage and tries to maintain a constant output voltage. An LDO regulator 112 may have a terminal 116 connected to ground 124, a terminal 118 connected to a power supply 120 supplying a voltage $V_{sup}$, and an output terminal for providing the output voltage $V_{dd}$ and an output current to an output terminal 122 of the voltage regulator. A load 126 may be connected to output terminal 122, therefore receiving the output voltage $V_{dd}$ while drawing a current $I_{load}$ or $I_{dd}$ from terminal 122. The LDO regulator 112 may receive external commands using an input terminal 128 according to a hardware control mechanism (HCM). These commands may be SPI commands sent by an MCU. Depending on the received command, the LDO regulator may change its mode of operation between normal mode and LP mode or may be turned off into ULP mode. The multimode voltage regulator 110 may also comprise the internal "sleep" voltage source 114 connected to power supply 120 and ground 124, providing the internal voltage $V_{dd\_int}$ to internal circuits of the multimode voltage regulator 110 independently of the actual mode of operation of the LDO regulator. $V_{dd\_int}$ may for example be 5 V or 3.3 V in any mode, whereas $V_{dd}$ and the output current drawn by a load connected to the output terminal may be 0 V during ULP and, for example, not more than 200 μA $I_{load}$. However, when in LP mode $V_{dd}$ may for example be 5V and the maximum $I_{load}$ to be drawn from output terminal 122 may be about 500 μA, whereas $V_{dd}$ may remain constant even while drawing a maximum $I_{load}$ of up to 60 mA when in normal mode. Unfortunately, the supply current $I_{vsup}$ received from power supply 120 required by the multimode voltage regulator may increase from, for example, 10 μA, when in ULP mode to 50 μA in LP mode and may be proportional to $I_{load}$. That is, it may increase for example up to 60 mA during normal mode operation.

Figure 2:
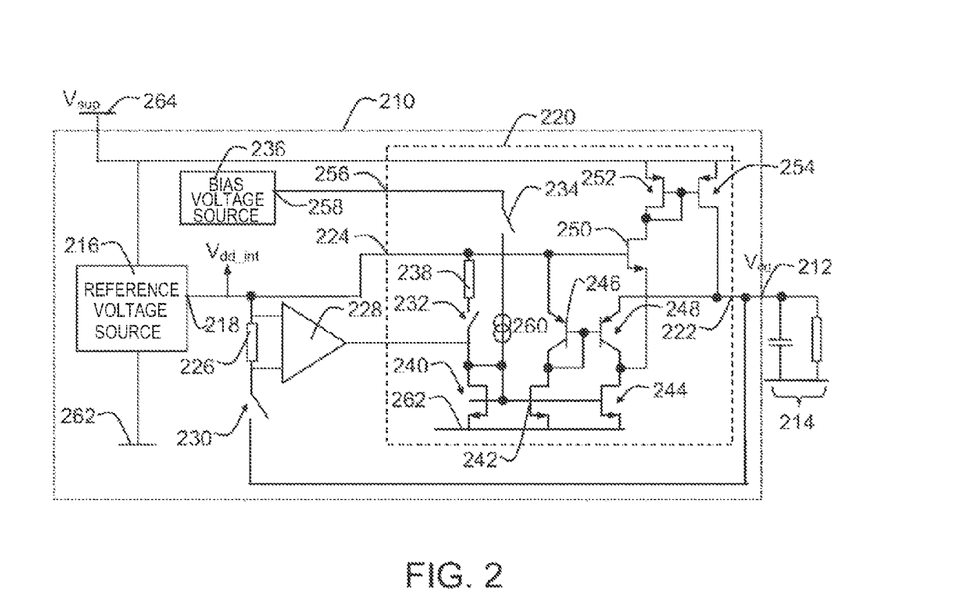
FIG. 2 schematically shows a block diagram of an example of an embodiment of a multimode voltage regulator according to the current invention.

Referring now to FIG. 2, a schematic block diagram of an example of an embodiment of a multimode voltage regulator 210 according to the current invention is shown, comprising an output 212 for providing a regulator output voltage $V_{dd}$ and an output current $I_{dd}$ to a load 214; a low power reference voltage source 216 having a reference voltage output 218 providing the regulator output voltage $V_{dd}$, when in a first low power mode an absolute value of the output current is not greater than a threshold value; a buffer amplifier 220 having a buffer amplifier output 222 providing the regulator output voltage $V_{dd}$ when the absolute value of the output current is greater than the threshold value, a first bias voltage input 224 being connected in a second low power mode to the reference voltage output 218 when the absolute value of the output current is greater than the threshold value for less than a predefined time ($t_{pre}$); and a mode controller 226, 228, 230, 232, 234 for automatically determining the absolute value of the output current and automatically switching from the first low power mode to the second low power mode.

The shown regulator circuit may be operated in ULP mode, normal mode, and LP mode, which is the first low power mode.

The reference voltage source 216 may provide an internal reference voltage $V_{dd\_int}$ at the reference voltage output 218, which may also be the regulator output voltage $V_{dd}$ when in LP mode, apart from a marginal voltage drop due to a very small resistance of shunt 226.

Additionally, the shown regulator circuit may be operated in a second low power (LP+) mode. The introduction of this mode may allow to avoid switching to normal mode, when the output current $I_{dd}$ drawn by a load connected to the output terminal of the regulator (which is the load current $I_{load}$ through load 214) is outside a threshold range, but for a shorter period of time than a predefined time $t_{pre}$. Especially during a cyclic wake-up, for example of an ECU used for a vehicle and powered by a vehicle battery, this may allow to minimize battery discharge when the engine of the vehicle is turned off and therefore does not recharge the battery. LP+ mode may, at least for a limited period of time, allow to supply the maximum current capability required by the MCU by the regulator 210 with only a fraction of the quiescent current $I_q$ required during cyclic switching between LP mode and LP+ mode compared to cyclic switching between LP and normal mode. In the shown circuit, automatic switching from LP mode to LP+ mode may be achieved using switches 230 and 232, with switch 234 being open, therefore disconnecting the shown bias voltage source 236 from buffer 220. The shown switches 230, 232, 234 may be implemented using transistors. However, any other electrical switching device may be used.

The automatic determination of the output current in order to decide whether or not to switch from LP mode to LP+ mode may be realized using a shunt resistor 226 and an operational amplifier circuit 228 connected to receive a voltage drop at shunt 226 proportional to the shunt current as an input. Circuit 228 may also comprise or receive a threshold value for the current. Depending on the determined current value, the multimode voltage regulator 210 may be switched from LP mode to LP+ mode. In the embodiment shown in FIG. 2, a current value outside of the range of the threshold value may cause switch 230 to be opened and switch 232, connected to resistor 238, to be closed. This may cause voltage $V_{dd}$ at regulator output 212 to be supplied by buffer amplifier output 222. In the shown embodiment, buffer amplifier 220 is implemented as a voltage buffer transforming the high impedance output level of power supply 264 providing voltage $V_{sup}$ to the possibly low impedance input level of the load circuit 214. The buffer 220 may comprise field effect transistors (FET) 240, 242, 244, 252 and bipolar transistors 246, 248, connected as current mirrors to provide power FET 254 with a gate voltage to drive a load current when required. However, any other circuitry implementing the same or similar functionality, allowing to switch the multimode voltage regulator 210 from LP mode to LP+ mode is in the scope of the described system.

ULP mode may be implemented by opening switches 230, 232, and 234, causing a $V_{dd}$ of about 0 V and a maximum load current $I_{load}$ of about 0 mA at output 212. However, at connection to ground 262 a small quiescent current $I_{q\_gnd}$ may remain, for example 2 µA. In LP mode, only switch 230 may be closed. When providing for example 5V $V_{dd}$, $I_{dd}$ may be less than, for example, 2 mA as a threshold value $I_{th}$ for decision on switching to LP+ mode. In LP mode quiescent current may for example be about 100 µA. However, after switching to LP+ mode, only switch 232 may be in closed position. While still providing the same $V_{dd}$, for example 5V, at output 212, the regulator may now be able to provide a high $I_{dd}$, up to for example 100 mA, and keep $V_{dd}$ with only little variation of $V_{dd}$ and at the same time low quiescent current of for example 250 µA. However, the regulator may provide a higher $I_{dd}$ with a lower or higher $I_{q\_gnd}$ than in the given example.

For implementing a normal mode, the multimode voltage regulator 210 may comprise a second bias voltage input 256 being connected in a third normal mode to a bias voltage output 258 of a bias voltage source 236 when the absolute value of the output current is greater than the threshold value for at least the predefined time ($t_{pre}$). When operated in normal mode, regulator 210 may for example provide a $V_{dd}$ of 5V and a load current of, for example, up to 100 mA or even more while applying one or more protection schemes, such as overcurrent, undervoltage, and overtemperature protection circuits. However, this may cause a higher quiescent current, which is the current consumed by regulator 210 itself without providing it to load 214, compared to LP+ mode, for example up to 6 mA or more.

Switch 234 may be closed and switches 230 and 232 may be opened, connecting bias voltage source 236 to buffer 220 with current source 260, that may for example provide a 10 µA current. The multimode voltage regulator may switch from LP+ mode to normal mode when a threshold value for output current at output 212 is exceeded for a time longer than the predefined time $t_{pre}$.

However, in another embodiment, the multimode voltage regulator 210 may also switch to normal mode, when an absolute output current value is a maximum current value, that is it exceeds another threshold value given by the absolute current maximum that could be supplied in LP+ mode, in case LP+ mode and normal mode are not operable to provide, at least for a short time, the same maximum $I_{load}$ current value.

Regulator 210 may be used together with an MCU as part of an ECU performing cyclic wake-up operations. ECUs using prior art voltage regulators may cyclically switch from LP mode to normal mode and check, whether or not an active state of the MCU is required and switch back to LP mode, when no wake-up is required. The disclosed multimode voltage regulator may automatically switch from LP mode to LP+ mode and the automatic switching between the first low power (LP) mode and the second low power (LP+) mode may be triggered by a cyclic change of the absolute value of the output current.

Figure 3:
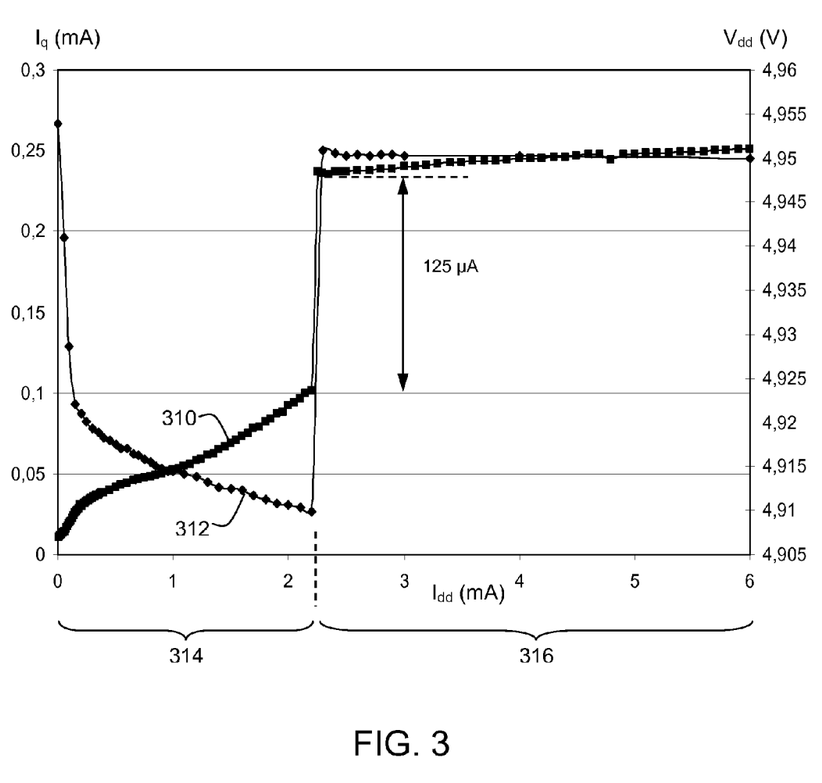
FIG. 3 shows a schematic diagram of an example of a current consumption and an output voltage of a multimode voltage regulator as a function of the regulator's output current.

Referring now also to FIG. 3, a schematic diagram of an example of a current $I_q$ consumption 310, which is the difference of current $I_{vsup}$ drawn from supply 264 and output current $I_{dd}$ at output 212, and an output voltage $V_{dd}$ 312 of a multimode voltage regulator 210 as a function of the regulator's output current $I_{dd}$, that is the current $I_{load}$ drawn by a load 214 connected to output terminal 212, is shown. The example shows a step at 2.2 mA $I_{dd}$, which is the chosen threshold for automatic transition from LP mode 314 to LP+ mode 316. It can be seen that during LP mode, an increasing $I_{dd}$ causes the supplied voltage $V_{dd}$ to drop, for the shown example from about 4.954 V to 4.910 V, whereas during LP+ mode $V_{dd}$ may be kept nearly constant, for the shown example about 4.950 V. The drop voltage may be very low, while nearly constantly consuming a current only slightly above the maximum $I_q$ during LP mode, for the example shown in FIG. 3 about 125 µA.

Figure 4:
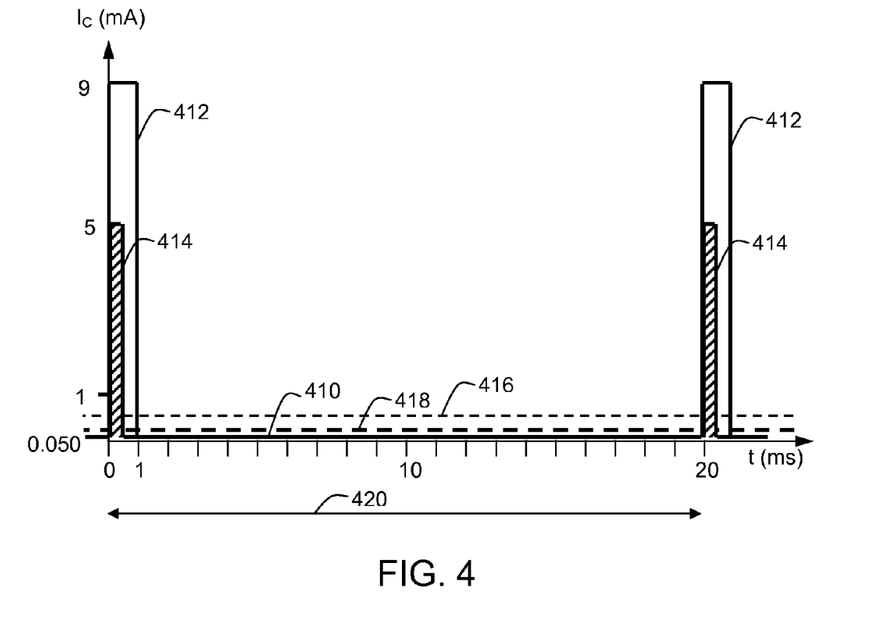
FIG. 4 shows a first schematic diagram of an example of a current consumption as a function of time during a cyclic wake-up operation.

Referring now also to FIG. 4, a first schematic diagram of an example of a current $I_C$ consumption of an ECU, which may be at least the current consumed by the regulator and the drawn load current, as a function of time t during a cyclic wake-up operation is shown.

In the shown example, a cyclic wake-up period 420 may last for 20 ms. For switching between LP mode 410 and normal mode 412, LP mode 410 may last for 19 ms and normal mode 412 for 1 ms. However, this 1 ms may already contain the time delay required for switching back from normal mode to LP mode. In comparison, an operation of switching between LP mode 410 and LP+ mode 414 is shown. Since in LP+ mode the MCU connected as a load may not be completely active, less current may be drawn by the load, causing less current consumption during LP+ mode and the transition back from LP+ mode to LP mode may not require much additional overtime. Hence, LP mode is reached again faster than during a transition from normal mode to LP mode.

50 µA are an example quiescent current $I_q$ during LP mode 410. The average current consumption when cyclically switching between LP mode and normal mode, avoiding LP+ mode, may for example be about 500 µA 416, compared to, for example, 175 µA average wake-up current consumption 418, when switching between LP mode and LP+ mode. Although LP+ mode may not provide all protection schemes available in normal mode, a current consumption of a system base chip comprising the regulator in the shown example may only be 125 µA, while providing maximum or at least a very high output current capability, at least for a limited period of time, and while providing current limitation and a "sleep" voltage reference.

Figure 5:
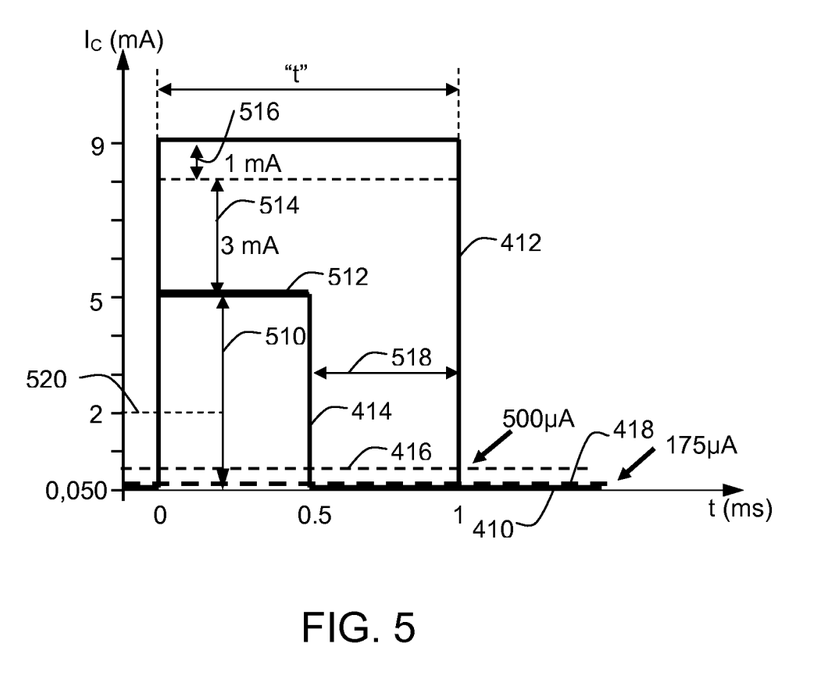
FIG. 5 shows a second schematic diagram of an example of a current consumption as a function of time during a cyclic wake-up operation.

Referring now also to FIG. 5, a schematic diagram of a second example of a current $I_C$ consumption of an ECU as a function of time t during a cyclic wake-up operation is shown. FIG. 5 may be regarded as a diagram of the first millisecond of the cyclic wake-up period 420 shown in FIG. 4 with a threshold current 520 of for example 2 mA, causing a transition from LP mode to LP+ mode or to normal mode.

In the shown example, current consumption Ic during LP+ mode 414 may consist of 5 mA current consumption 510 of the MCU and sensors due to the wake-up event, and 125 µA current consumption 512 of the system base chip comprising the multimode voltage regulator 210. For a duration of a cyclic wake-up period of, for example, 20 ms according to FIG. 4, the average current consumption 418 during a wake-up period may be 175 µA, comprising 50 µA average quiescent current $I_q$ during LP mode 410. 50 µA $I_q$ during LP mode may for example consist of 20 µA SBC consumption and 30 µA MCU consumption. However, the average current consumption 418 during a wake-up period may be lower or higher, for example up to 500 µA.

A system switching between LP mode and normal mode 412 may have a higher current consumption. In addition to consumption due to the wake-up event itself 510, a system base chip may cause a current consumption 514 of, for example, 3 mA, when the voltage regulator of the system base chip (SBC) is used in normal mode 412. Additionally, the MCU and the required signalling of SPI commands may for example consume about 1 mA more 516. Furthermore, additional transition time 518 back from normal mode to LP mode may be required. Given for example a time "t" of 1 ms and a cycle period of 20 ms, according to the example shown in FIG. 4, an average current consumption of an ECU performing cyclic wake-up by switching between normal mode and LP mode may be about 500 µA. Hence, nearly 3 times the current may be consumed during cyclic wake-up operation, when cyclically switching to normal mode is performed instead of switching to LP+ mode.

In the example shown in FIG. 5, the predefined time $t_{pre}$ for LP+ mode is chosen to be 0.5 ms. However, other values are possible. In an embodiment of the described multimode voltage regulator, the predefined time may be provided by a programmable timer. This may allow to adjust the duration of LP+ mode to the parameters of each wake-up procedure and to optimize required current consumption. For example, the predefined time $t_{pre}$ may be programmable in a range of 1 to 40 ms or 3 to 32 ms. Limiting the time in LP+ mode may reduce the time protection schemes are disabled. And it may reduce the time a watchdog monitoring MCU operation may be disabled.

The multimode voltage regulator 210 may allow a controller unit connected to the regulator output to be operable at a maximum current capability without the regulator receiving a prior wake-up signal. The transition from LP to LP+ mode may be performed without any external commands, for example SPI commands. For example, when the MCU is connected as a load to the regulator 210, and a wake-up event known to the MCU may cause the controller to wake up, activate more circuits and require more current, the regulator may supply the increased current without any command or message explicitly sent to the regulator 210. When the regulator output is operable to provide the maximum current capability to the load, same as the normal mode, the controller may function identically or very similar to a controller connected to a voltage regulator using normal mode and not an LP+ mode during cyclic wake-up.

Switching back to LP mode from LP+ mode may be triggered by an external command. In an embodiment of the multimode voltage regulator, switching back from LP+ mode to LP mode may also be triggered by the predefined timer value. After the predefined time is over, the regulator may either switch to normal mode in case the output current value is still greater than the threshold current value or may switch back to LP mode. Therefore, the multimode voltage regulator as described above may comprise switches for automatically switching from the second low power (LP+) mode to the first low power (LP) mode after a transition of the absolute value of the output current ($I_{dd}$) from a value greater than the threshold value to a value below the threshold value. Any direct or indirect determination of the output current at output terminal 212 and its comparison with the threshold value for switching from LP mode to LP+ mode may be used for triggering switching back to LP mode. The switches may be those used for switching from LP mode to LP+ mode, for example switches 230, 232 connected to control circuitry for automatically setting the switches.

In a fourth (ULP) mode neither the buffer amplifier 220 nor the reference voltage source 216 may provide the regulator output voltage $V_{dd}$. This mode with no output at output terminal 212 may be an initial mode.

The multimode voltage regulator 210 as shown in FIG. 2 may comprise a buffer amplifier 220. The buffer amplifier (or short: buffer) may be a voltage follower circuit, that is the output voltage follows or tracks the input voltage. The voltage gain of a voltage follower may be approximately unity. However, the current gain (and therefore the power gain) may be more or much more than unity.

The multimode voltage regulator as described above may cause a current consumption when cyclically switching between the first low power mode (LP mode) and the second low power mode (LP+ mode) that is, for example, less than eighty percent of the consumption when cyclically switching directly between the first low power mode (LP mode) and the third normal mode. Due to this reduction of overall current consumption, standby time of ECUs connected to a limited power source such as a battery, may be increased.

Figure 6:
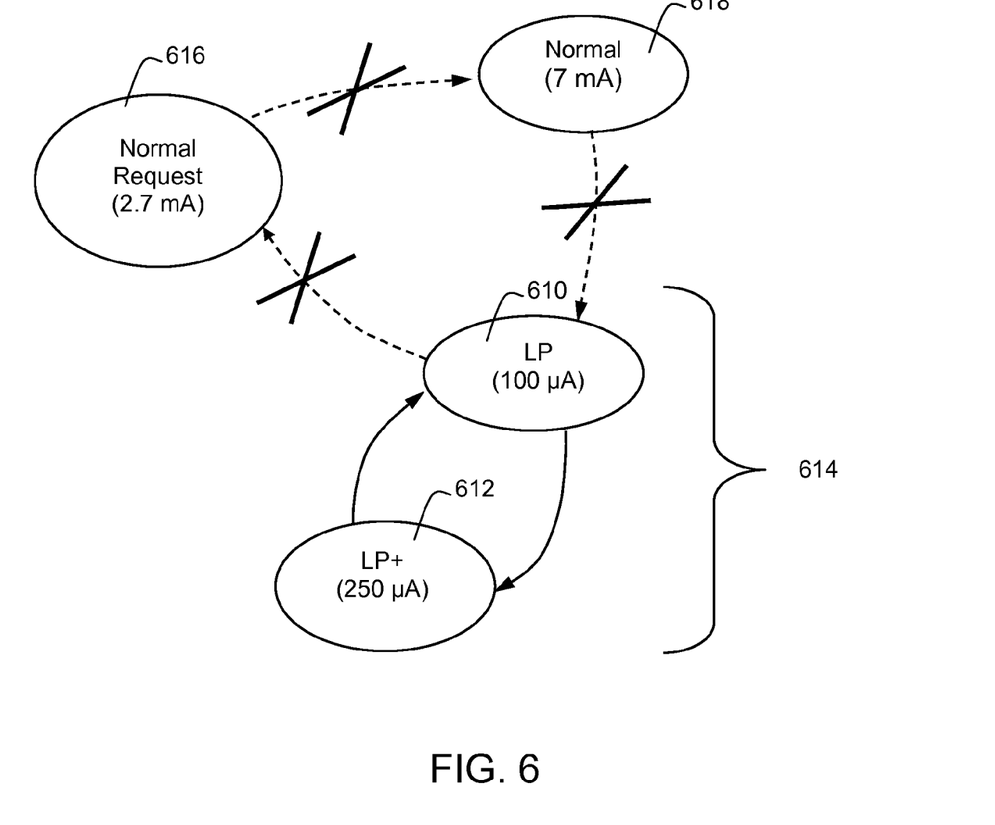
FIG. 6 schematically shows a state diagram of an example of an embodiment of a multimode voltage regulator performing a cyclic wake-up.

Referring now to FIG. 6, a schematic state diagram of an example of an embodiment of a multimode voltage regulator performing a cyclic wake-up 614 is shown. The voltage regulator in a first low power (LP) mode 610, for example consuming a quiescent current of 100 µA, may automatically change to a second low power (LP+) mode 612, for example consuming a quiescent current of 250 µA and may automatically return into LP mode 610 after a predefined time. This cyclic change may replace a prior art transmission from LP mode 610 via a normal mode request state 616 to normal mode 618. A transition from LP mode 610 to normal request state 616 may not be performed automatically but may require an external command, such as a SPI command. External commands may also be required for changing from normal request state 616 to normal mode 618 and for a transition back to low power mode 610. Normal request state 616 may for example consume about 2.7 mA, whereas operation in normal mode 618 may for example require about 7 mA of current consumption.

Figure 7:
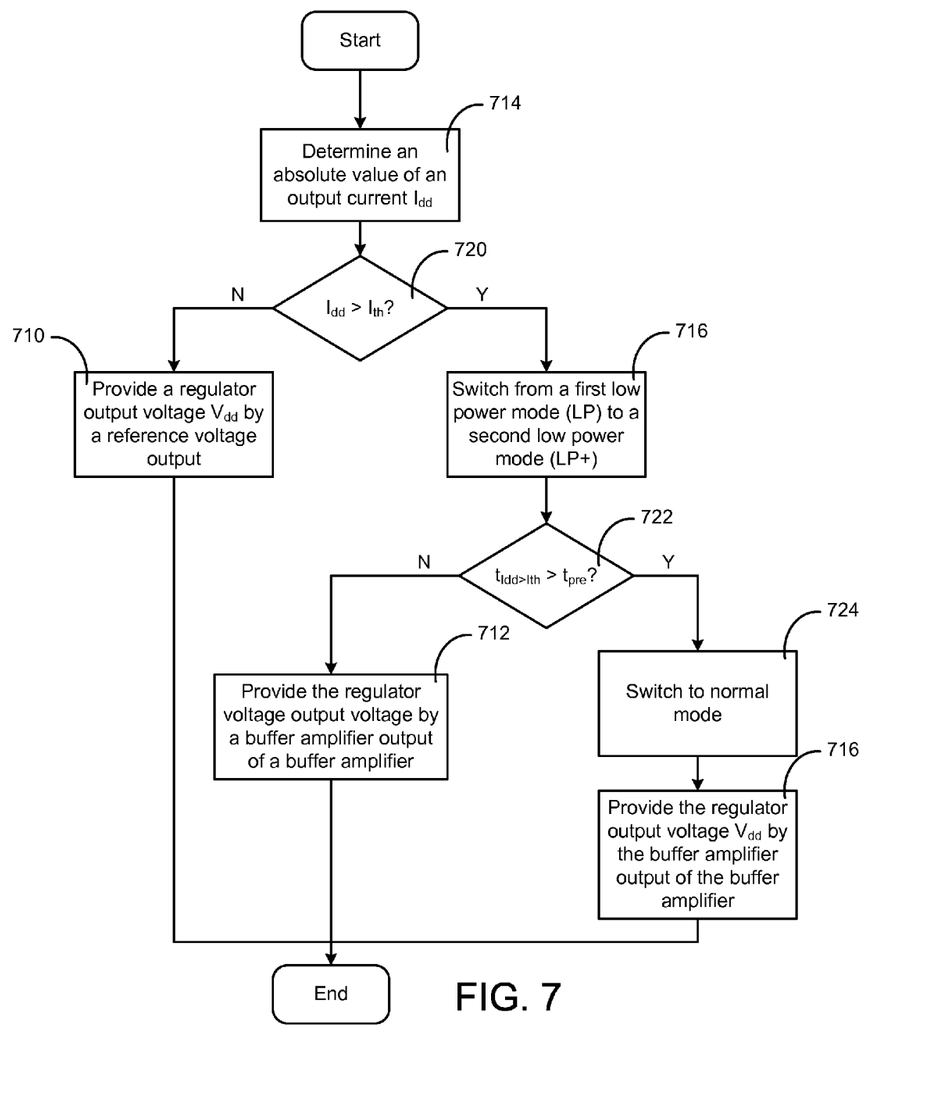
FIG. 7 schematically shows a flow diagram of an example of an embodiment of a method for providing a multimode voltage regulator output voltage and an output current to a load.

Referring now also to FIG. 7, a schematic flow diagram of an example of an embodiment of a method for providing a multimode voltage regulator output voltage and an output current to a load is illustrated. A method for providing a multimode voltage regulator output voltage $V_{dd}$ and an output current $I_{dd}$ to a load may comprise providing 710 the regulator output voltage $V_{dd}$ by a reference voltage output 218 of a low power reference voltage source 216 when in a first low power mode an absolute value of the output current $I_{dd}$ is not greater than a threshold value Ith 720. It may further comprise providing 712 the regulator output voltage by a buffer amplifier output 222 of a buffer amplifier 220 having a first bias voltage input 224 being connected in a second low power mode to the reference voltage output 218 when the absolute value of the output current $I_{dd}$ is greater than the threshold value Ith for less than a predefined time tpre 722. Other steps of the method may be automatically determining 714 the absolute value of the output current $I_{dd}$ and automatically switching 716 from the first low power mode (LP) to the second low power mode (LP+). The method may be cyclically repeated.

The method may also comprise providing 718 the regulator output voltage $V_{dd}$ by the buffer amplifier output 222 of the buffer amplifier 220 having a second bias voltage input 256 being connected in a third normal mode to a bias voltage output 258 of a bias voltage source 236 when the absolute value of the output current $I_{dd}$ is greater than the threshold value Ith for at least the predefined time $t_{pre}$. For this, the regulator 210 may switch to normal mode 724.

The illustrated method allows implementing the advantages and characteristics of the described multimode voltage regulator as part of a method for providing a multimode voltage regulator output voltage and an output current to a load.

And a system base chip may comprise a multimode voltage regulator or may implement a method as described above.

Figure 8:
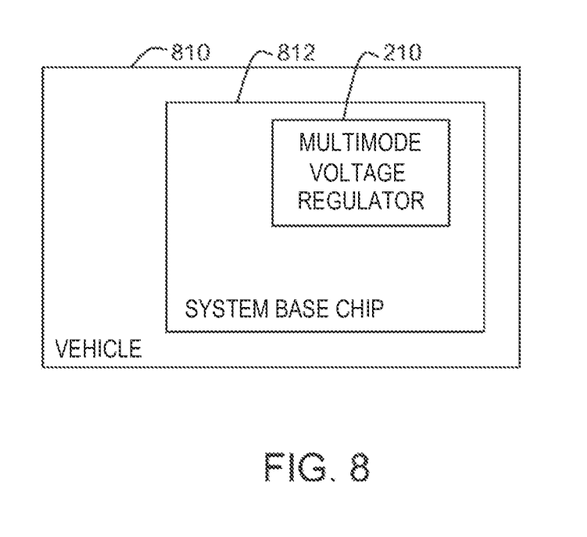
FIG. 8 schematically shows a block diagram of an example of a vehicle comprising a system base chip having a multimode voltage regulator.

Referring now also to FIG. 8, a vehicle 810 may comprise a system base chip 812 as mentioned above or a multimode voltage regulator 210 or may implement a method as described above. A vehicle may be any automotive device such as a car, a plane, a helicopter, a ship, and so on.

Furthermore a computer program product may comprise code portions for executing steps of a method or for implementing parts of a multimode voltage regulator as described above when run on a programmable apparatus.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Also, at least portions of the regulator 210 may be implemented using a programmable logic device (PLD), e.g. a field programmable gate array (FPGA), an application specific integrated circuit (ASIC) etc., or as a program code executable by a processing device, such as a digital signal processor (DSP), a microcontroller unit (MCU), a general purpose processor (GPP), a central processing unit (CPU) etc.

Each logic signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Although the invention has been described with respect to specific conductivity types or polarity of potentials, skilled artisans appreciated that conductivity types and polarities of potentials may be reversed.

Some of the above embodiments, as applicable, may be implemented using a variety of systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of regulator 210 are circuitry located on a single integrated circuit or within a same device. Alternatively, regulator 210 may include any number of separate integrated circuits or separate devices interconnected with each other. For example, buffer amplifier 220 may be located on a same integrated circuit as reference voltage source 216 or on a separate integrated circuit. Also for example, regulator 210 or portions thereof may be soft or code representations of physical circuitry or of logical representations convertible into physical circuitry. As such, voltage regulator 210 may, at least partly, be embodied in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A multimode voltage regulator, comprising
an output for providing a regulator output voltage and an output current to a load;
a low power reference voltage source having:
a reference voltage output providing said regulator output voltage, when in a first low power mode an absolute value of said output current is not greater than a threshold value;
a buffer amplifier having a buffer amplifier output providing said regulator output voltage, when said absolute value of said output current is greater than said threshold value;
a first bias voltage input being connected in a second low power mode to said reference voltage output when said absolute value of said output current is greater than said threshold value for less than a predefine time; and
a second bias voltage input being connected in a third normal mode to a bias voltage output of a bias voltage source when said absolute value of said output current is greater than said threshold value for at least said predefined time; and
a mode controller for automatically determining said absolute value of said output current and automatically switching from said first low power mode to said second low power mode.

2. The multimode voltage regulator as claimed in claim 1, wherein said automatic switching between said first low power mode and said second low power mode is triggered by a cyclic change of said absolute value of said output current.

3. The multimode voltage regulator as claimed in claim 1, wherein said predefined time is provided by a programmable timer.

4. The multimode voltage regulator as claimed in claim 1, wherein a controller unit connected to said regulator output is operable at a maximum current capability without said regulator receiving a prior wake-up signal.

5. The multimode voltage regulator as claimed in claim 1, comprising switches for automatically switching from said second low power mode to said first low power mode after a transition of said absolute value of said output current from a value greater than said threshold value to a value below said threshold value.

6. The multimode voltage regulator as claimed in claim 1, wherein in a fourth mode neither said buffer amplifier nor said reference voltage source provide said regulator output voltage.

7. The multimode voltage regulator as claimed in claim 1, wherein said buffer amplifier is a voltage follower circuit.

8. The multimode voltage regulator as claimed in claim 1, wherein a current consumption when cyclically switching between said first low power mode and said second low power mode is less than eighty percent of said consumption when cyclically switching directly between said first low power mode and said third normal mode.

9. A method for providing a multimode voltage regulator output voltage and an output current to a load, the method comprising providing said regulator output voltage by a reference voltage output of a low power reference voltage source when in a first low power mode an absolute value of said output current is not greater than a threshold value;
providing said regulator output voltage by a buffer amplifier output of a buffer amplifier having a first bias voltage input being connected in a second low power mode to said reference voltage output when said absolute value of said output current is greater than said threshold value for less than a predefined time;
automatically determining said absolute value of said output current;
automatically switching from said first low power mode to said second low power mode; and
providing said regulator output voltage by said buffer amplifier output of said buffer amplifier having a second bias voltage input being connected in a third normal mode to a bias voltage output of a bias voltage source when said absolute value of said output current is greater than said threshold value for at least said predefined time.

10. A system base chip, comprising
a multimode voltage regulator as claimed in claim 1.

11. A vehicle comprising a system base chip as claimed in claim 9.

12. A computer program product, comprising code portions for executing steps of a method as claimed in claim 8.

13. The method of claim 9, wherein automatically switching between the first low power mode and the second low power mode is triggered by a cyclic change of the absolute value of the output current.

14. The method of claim 9, wherein a current consumption when cyclically switching between the first low power mode and the second low power mode is less than eighty percent of the consumption when cyclically switching directly between the first low power mode and the third normal mode.

15. A method comprising:
providing only an internal voltage of a low power reference voltage source when the low power reference voltage source is in an ultra low power mode;
providing, by a reference voltage output of the low power reference voltage source, a regulator output voltage when the low power reference voltage source is in a first low power mode, and in response to an absolute value of an output current being less than a threshold value;
providing, by a buffer amplifier output of a buffer amplifier having a first bias voltage input being connected to the reference voltage output when the low power reference voltage source is in a second low power mode, the regulator output voltage in response to the absolute value of the output current being greater than the threshold value for less than a predefined time;
automatically determining the absolute value of said output current;
automatically switching from the first low power mode to said second low power mode; and
providing, by the buffer amplifier output of the buffer amplifier having a second bias voltage input being connected to a bias voltage output of a bias voltage source in a normal mode, the regulator output voltage in response to the absolute value of the output current being greater than the threshold value for at least said predefined time.

16. The multimode voltage regulator of claim 15, wherein the automatic switching between the first low power mode and the second low power mode is triggered by a cyclic change of the absolute value of the output current.

17. The multimode voltage regulator of claim 15, wherein a controller unit connected to the regulator output is operable at a maximum current capability without the regulator receiving a prior wake-up signal.

18. The method of claim 15, further comprising:
automatically switching from the second low power mode to the first low power mode after a transition of the absolute value of the output current from a value greater than the threshold value to a value below the threshold value.

19. The method of claim 15, wherein the predefined time is provided by a programmable timer.

20. The multimode voltage regulator of claim 15, wherein a current consumption when cyclically switching between the first low power mode and the second low power mode is less than eighty percent of the consumption when cyclically switching directly between the first low power mode and the third normal mode.

* * * * *